United States Patent
Bodin et al.

(10) Patent No.: US 9,071,115 B2
(45) Date of Patent: Jun. 30, 2015

(54) METHOD FOR PRODUCING THE COIL OF A ROTARY ELECTRIC MACHINE STATOR AND STATOR THUS OBTAINED

(75) Inventors: Denis Bodin, Saint Martin Boulogne (FR); Jean-Pierre Chochoy, Cremarest (FR); Alain Defebvin, Cormont (FR); Michel Jaze, Frencq (FR); Denis Even, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 1881 days.

(21) Appl. No.: 12/160,659

(22) PCT Filed: Jan. 5, 2007

(86) PCT No.: PCT/FR2007/050613
§ 371 (c)(1),
(2), (4) Date: May 13, 2010

(87) PCT Pub. No.: WO2007/080339
PCT Pub. Date: Jul. 19, 2007

(65) Prior Publication Data
US 2010/0231082 A1   Sep. 16, 2010

(30) Foreign Application Priority Data

Jan. 16, 2006  (FR) ..................................... 06 50140
Jan. 5, 2007  (WO) ................. PCT/FR2007/050613

(51) Int. Cl.
*H02K 3/04*  (2006.01)
*H02K 15/06*  (2006.01)
*H02K 3/12*  (2006.01)
(Continued)

(52) U.S. Cl.
CPC .......... *H02K 15/066* (2013.01); *Y10T 29/49009* (2015.01); *H02K 3/12* (2013.01); *H02K 3/28* (2013.01); *H02K 15/0478* (2013.01)

(58) Field of Classification Search
CPC ........ H02K 3/28; H02K 3/01; H02K 15/0662
USPC ......... 310/195, 200, 203–204, 207–208, 201, 310/202; 29/596, 598
See application file for complete search history.

(56) References Cited

U.S. PATENT DOCUMENTS 3,079,519 A *  2/1963  Kitson, Jr. et al. ............ 310/208
3,749,950 A *  7/1973  Lenz ............................... 310/45
7,011,266 B2  3/2006  Hashimoto et al.
(Continued)

FOREIGN PATENT DOCUMENTS

JP  11289723 A  10/1999
JP  2004166316 A  6/2004
(Continued)

*Primary Examiner* — Jose Gonzalez Quinone
(74) *Attorney, Agent, or Firm* — Jacox, Meckstroth & Jenkins

(57) ABSTRACT

A stator which comprises
a core, slots provided in the core and a coil comprising a plurality of windings,
in which each winding consists of at least one conductor which is arranged in slots of the core associated with the winding, forming axial ripples and forming overall a spiral coaxial to axis A of the core which consists of a set of turns radially superimposed,
wherein each conductor comprises a pair of electrical lead wires which are adjacent and which are arranged at the same radial dimension relative to one another, at each point of the conductor. The invention also proposes a method for constructing the stator.

17 Claims, 11 Drawing Sheets

(51) Int. Cl.
*H02K 3/28* (2006.01)
*H02K 15/04* (2006.01)

(56) References Cited

U.S. PATENT DOCUMENTS

| | | | |
|---|---|---|---|
| 7,088,026 B2 | 8/2006 | Gorohata et al. | |
| 7,091,644 B2 | 8/2006 | Fukushima et al. | |
| 7,311,284 B2 | 12/2007 | Hashimoto et al. | |
| 2002/0079775 A1* | 6/2002 | Janssen et al. | 310/208 |
| 2004/0061400 A1 | 4/2004 | Fukushima et al. | |
| 2005/0061907 A1 | 3/2005 | Hashimoto et al. | |
| 2005/0110357 A1* | 5/2005 | Fukasaku et al. | 310/179 |
| 2005/0133655 A1 | 6/2005 | Hashimoto et al. | |
| 2005/0212372 A1* | 9/2005 | Akita et al. | 310/180 |
| 2005/0269890 A1 | 12/2005 | Gorohata et al. | |
| 2006/0238043 A1 | 10/2006 | Gorohata et al. | |
| 2010/0295393 A1* | 11/2010 | Dunesme et al. | 310/71 |

FOREIGN PATENT DOCUMENTS

| | | | |
|---|---|---|---|
| JP | 2005348496 A | | 12/2005 |
| JP | 2008043026 A | * | 2/2008 |
| JP | 2008148431 A | * | 6/2008 |
| JP | 2009303335 A | * | 12/2009 |

* cited by examiner

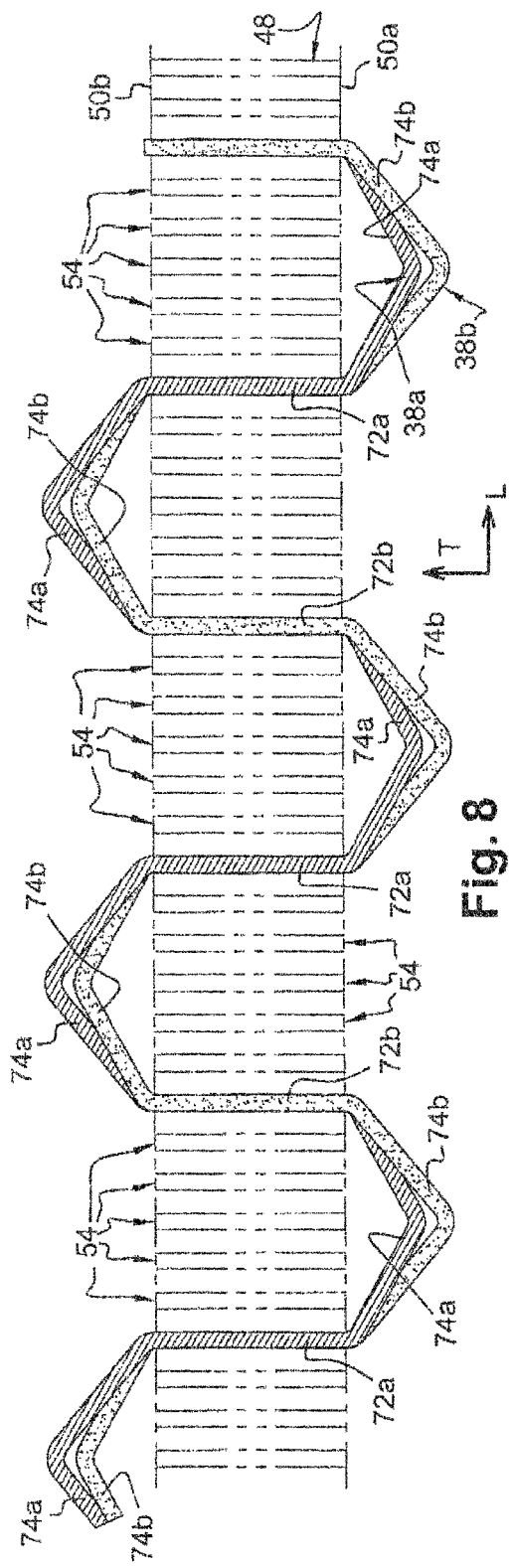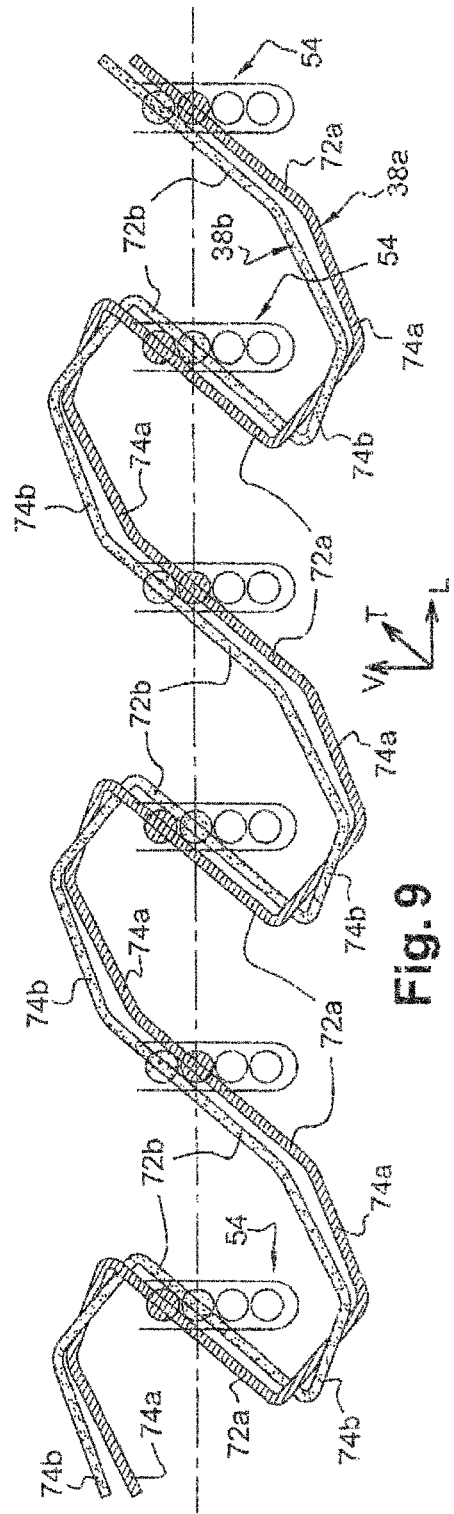

METHOD FOR PRODUCING THE COIL OF A ROTARY ELECTRIC MACHINE STATOR AND STATOR THUS OBTAINED

CROSS-REFERENCE TO RELATED APPLICATIONS

This application claims priority to PCT Application PCT/FR2007/050613 filed Jan. 5, 2007 and also to French Application No. 0650140 filed Jan. 16, 2006, which applications are incorporated herein by reference and made a part hereof.

BACKGROUND OF THE INVENTION

1. Field of the Invention

The invention proposes a stator for an electric rotary machine comprising a coil formed from a plurality of lead wires, which are distributed in the slots of the core in an optimized manner.

The invention proposes more particularly a stator for an electric rotary machine which comprises an annular core, with its principal axis being vertical overall, which is delimited axially by an upper face and by a lower face, and which is delimited radially by an annular internal face, a set of axial slots provided in the annular internal face of the core and which open out in the upper face and in the lower face of the core, and a coil comprising a plurality of windings of the type in which each winding consists of at least one conductor which is arranged in slots of the core associated with the winding, forming axial ripples and forming overall a spiral coaxial to axis A of the core which consists of a set of turns radially superimposed.

2. Description of the Related Art

According to an embodiment of the prior art, each coil comprises one or several conductors in a spiral, each turn of which forms ripples covering the slots of the core.

To improve the performance of the electric machine, it is preferable to fill the slots of the core to the maximum, while optimizing the flow sections of the magnetic flux.

For this reason, with regard to stators used in alternators intended in particular for automotive applications, it has been proposed to build up the stator so as to allow two strands of conductors to be assembled in each slot at the same radial dimension relative to the principal axis of the stator.

A solution of this kind allows the load factor of each slot to be increased and also increases the number of strands of each coil.

This increase in the number of strands of the windings poses certain problems as regards the coil snarls, as the arrangement of the strands of each lead wire, forming the snarls, is not optimized. The result is that the radial thickness of each snarl of a coil formed from lead wires with reduced cross-section, according to such a solution, is greater than the thickness of a snarl of a coil comprising a reduced number of lead wires with larger cross-section.

SUMMARY OF THE INVENTION

One object of the invention is to propose a stator for an electric rotary machine in which the lead wires are distributed so as to optimize the overall volume of the coil and its axial ends, or snarls.

With this aim the invention proposes a stator of the type described previously, characterized in that each conductor comprises a pair of electrical lead wires, which are adjacent and which are arranged at the same radial dimension, relative to one another, at each point of the conductor.

Here radial dimension is understood to mean the distance between the axis of the stator and the conductor strand measured over the radius connecting the axis to the strand. Thus two strands having the same radial dimension means that the distance between the axis of the stator and each strand is identical, and indicating that the two strands having the same radial dimension relative to one another at each point of the conductor means that each strand over its entire length is the same distance from the axis of the stator.

According to other features of the invention:

for each turn, the two wires form complementary axial ripples which are overlapped axially, so that one of the two wires is positioned axially above the other;

each wire of the conductor comprises, consecutively, from upstream to downstream:

a lower strand which is arranged overall below the lower face of the core, an upstream axial strand which is arranged in a first slot associated with the winding, an upper strand which is arranged overall above the upper face of the core, and a downstream axial strand which is arranged in a second slot associated with the winding, the second slot being positioned downstream relative to the first slot;

in at least one turn of the coil, the lower strand of a first wire is arranged axially above a lower strand of a second wire, the first axial strand of the first wire is positioned upstream of the first axial strand of the second wire, the upper strand of the first wire is arranged axially above the upper strand of the second wire and the second axial strand of the first wire is positioned downstream of the second axial strand of the second wire;

in at least another turn of the coil, the lower strand of the first wire is arranged axially below a lower strand of the second wire, the first axial strand of the first wire is positioned upstream of the first axial strand of the second wire, the upper strand of the first wire is arranged axially below the upper strand of the second wire and the second axial strand of the first wire is positioned downstream of the second axial strand of the second wire;

all the axial strands of each wire, which are arranged in the same slot, are positioned at the same angular dimension about axis A of the stator.

The invention also proposes a method to reduce the time for building up such a stator comprising an increased number of lead wires.

To this end the invention also proposes a method for winding a stator according to any one of the preceding claims, which comprises, successively, for each winding:

a stage of winding the conductor onto a linear support in the form of a longitudinal rail comprising transverse slots;

a first stage of transferring the conductor from the linear support into an annular support, and a second stage of transferring the conductor from the annular support into the core, of the type in which the winding stage consists of placing the conductor in slots associated with the winding so that each wire comprises an axial strand which is received in each associated transverse slot, and so that each wire comprises longitudinal strands which are arranged transversely on either side of the linear support, wherein during the winding stage, the two wires of the conductor are placed simultaneously onto the linear support and the associated slots successively receive the two wires so that in each slot, the two wires are superimposed vertically one above the other, and so that in a first slot, the axial strand of the first wire is arranged above the axial strand of the second wire, and in a second slot, which is consecutive to the first slot, the axial strand of the first wire is arranged below the axial strand of the second wire.

According to other features of the method according to the invention:

during the winding stage, the two wires of the conductor are placed onto the linear support, so that the length of the longitudinal strands of the first wire, which are arranged on the right of the linear support is less than the length of the longitudinal strands of the second wire which are arranged on the right of the linear support.

during the winding stage, the two wires of the conductor are placed onto the linear support, so that the length of the longitudinal strands of the first wire, which are arranged on the left of the linear support is greater than the length of the longitudinal strands of the second wire which are arranged on the left of the linear support.

during the winding stage, the two wires of the conductor are placed onto the linear support, so that each longitudinal strand of the first wire, which is arranged on the right of the linear support is arranged transversely between the linear support and the associated longitudinal strand of the second wire.

during the winding stage, the two wires of the conductor are placed onto the linear support, so that each longitudinal strand of the second wire, which is arranged on the left of the linear support is arranged transversely between the linear support and the associated longitudinal strand of the first wire.

the first transfer stage consists in successively transferring the strands which are arranged in each slot of the linear support, to an associated radial slot of the annular support so that, in each radial slot, the strands are radially superimposed.

the second transfer stage consists in simultaneously transferring the strands arranged in each radial slot of the annular support into a slot opposite the core.

during the second transfer stage, all the strands which are arranged at the same radial dimension in the radial slots of the annular support are angularly offset in the associated slot in the upstream or in the downstream direction.

These and other objects and advantages of the invention will be apparent from the following description, the accompanying drawings and the appended claims.

BRIEF DESCRIPTION OF THE ACCOMPANYING DRAWINGS

Other features and advantages of the invention will become apparent on reading the detailed description which follows, for the understanding of which reference will be made to the appended figures, wherein:

FIG. 8 is a detailed view of the arrangement of two wires forming the same conductor on the linear support, showing the position of the sections of the two wires, relative to one another;

FIG. 9 is a diagrammatic illustration in perspective of the two wires illustrated in FIG. 8;

DETAILED DESCRIPTION OF THE PREFERRED EMBODIMENTS

In order to describe the invention, the orientations according to the reference symbols indicated on the figures will be used on a non-restrictive basis.

In the description which follows, identical, similar or like elements will be designated by the same reference numbers.

Figure 1:
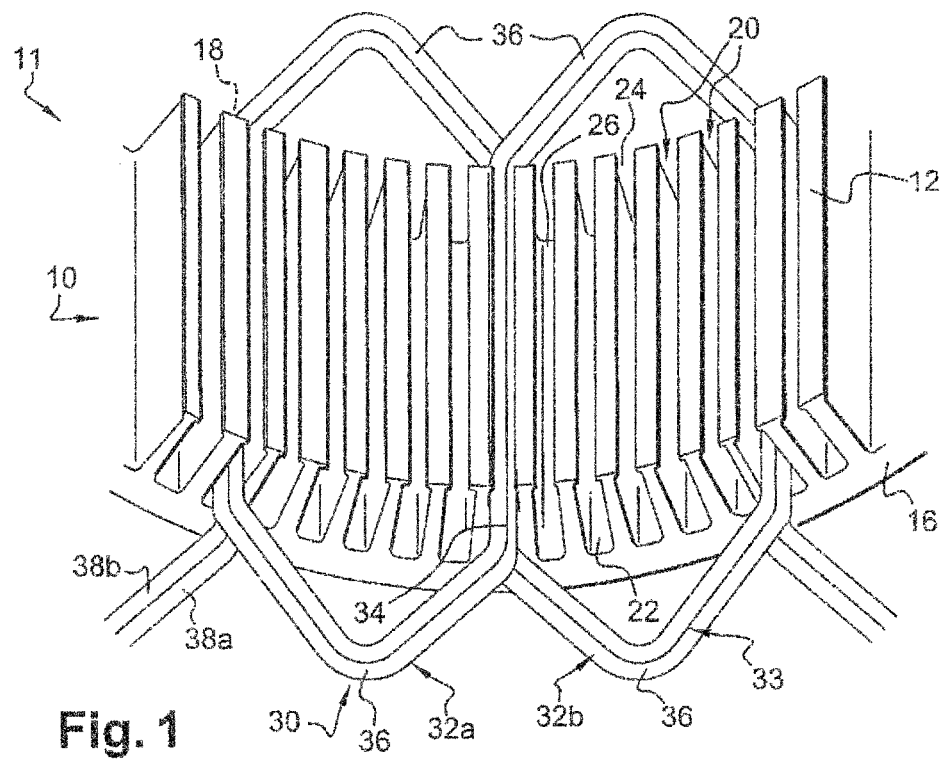
FIG. 1 is a partial perspective view of the interior of a stator in which the lead wire are arranged in accordance with the invention.

FIG. 1 shows a partial view of a stator 11 for an electric rotary machine which mainly comprises a core 10 in which are assembled several phase windings 30, of which only one phase winding 30 has been illustrated here. Moreover, here, the core 10 is constructed in such a manner that it is capable of receiving six similar phase windings 30.

The rotary machine is for example an alternator or a starter-alternator. This machine is preferably intended to be used in a motor vehicle.

It is pointed out that a starter-alternator is an electric rotary machine able to work in a reversible way, on the one hand as an electric generator functioning as an alternator, and on the other hand as an electric motor, in particular for starting the combustion engine of the motor vehicle.

Figure 2:
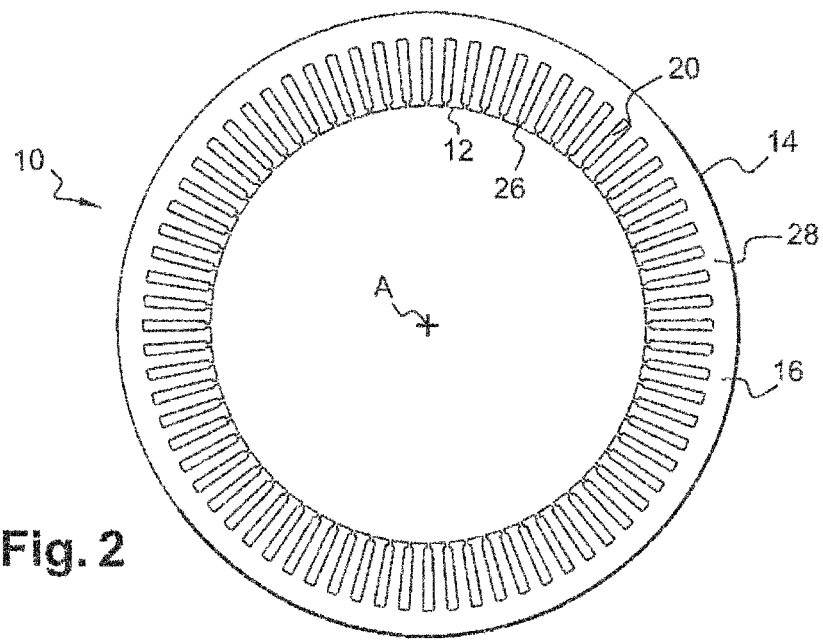
FIG. 2 is an end view of the stator core illustrated in FIG. 1.

FIG. 2 shows the stator core 10 of the stator 11 illustrated in FIG. 1. The stator core 10 is of an annular cylindrical form having axis "A" and consists of an axial pile of flat metal plates. The stator core 10 is thus commonly called the "core".

The stator core 10 is delimited radially by an internal cylindrical face 12 and by an external cylindrical face 14, and is delimited axially by a radial face with an axial lower end 16 and by a radial face with an axial upper end 18 (FIG. 1).

The core 10 comprises axial slots 20 which open out axially into the radial faces of axial lower end 16 and axial upper ends 18 of the core 10 by means of front 22 and rear 24 axial apertures.

Slots 20 open out radially into the internal cylindrical face 12 of the core 10 by means of an axial groove 26 which extends from the axial lower end 16 to the axial upper end 18.

The transverse width of each axial groove 26 is less than the width of the associated slot 20.

Slots 20 are all identical and number seventy-two for example. They are distributed in a regular manner angularly about axis "A" of core 10.

The full external annular portion of the core 10 into which slots 20 do not extend, is called the yoke 28.

In order to form the stator 11, several phase windings 30 are assembled in the core 10.

The invention will be described with reference to a stator 11 comprising six phase windings 30, hence called a "hexaphase" stator.

The invention is however applicable to stators comprising a different number of phase windings, and in particular "three-phase" stators comprising three phase windings 30. The stator core 10 then comprises for example thirty-six or forty-eight slots 20.

Each phase winding 30 comprises rippled turns 32, formed by an electrical conductor 33, which are piled up radially.

FIG. 1 shows only two turns 32 of a phase winding 30, it being understood that the winding 30 may comprise a greater number of turns 32.

Each conductor 33 comprises a series of axial sections 34 which are received in a series of associated slots 20.

Each conductor 33 also comprises connecting sections 36 with overall transverse orientation, which connect the consecutive axial sections 34 of the winding 30, and which extend projecting alternately relative to the face of axial upper end 18 and projecting relative to the face of axial lower end 16.

Slots 20 of a series of slots receive the axial sections 34 of the conductors 33 constituting a phase winding 30.

Each series of slots 20 is associated with one of the six phase windings 30. Two consecutive slots 20 of a series of slots 20 are separated by adjacent slots 20, each corresponding to another series of slots 20 associated with one of the other five phase windings 30.

Thus, for a hexaphase stator as is the case in FIG. 1, five adjacent slots 20 are left free between two slots 20 of each series. In other words the wires of a winding are inserted in a slot 20 out of six adjacent slots 20.

Thus for a stator comprising N phase windings 30, the axial sections 34 of a turn 32 are received in a slot 20 out of N adjacent slots 20.

Figure 3:
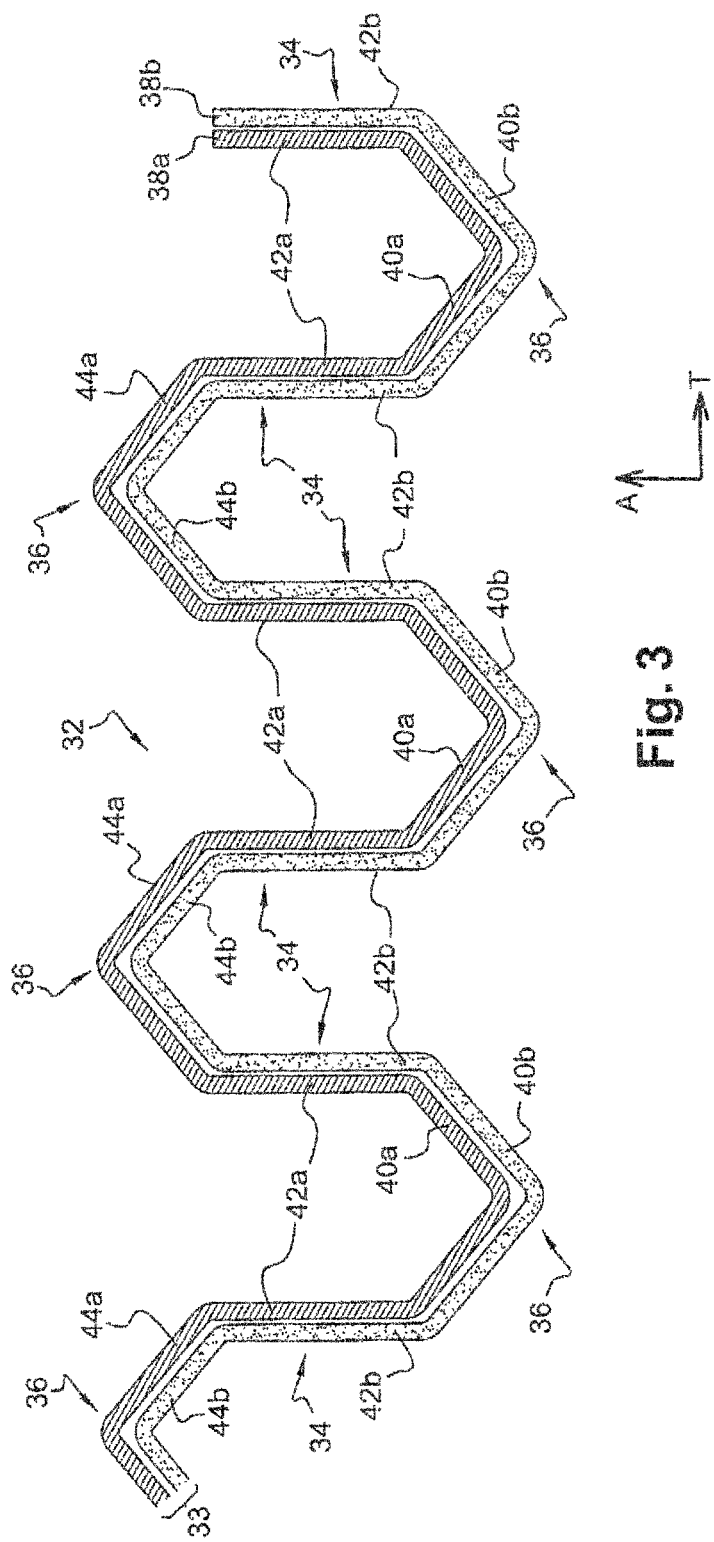
FIG. 3 is a linear development of two lead wires forming a winding, showing the axial position of the two wires, relative to one another.

FIG. 3 shows the linear development of a turn 32 of a winding 30 formed on the basis of a single conductor 33.

In accordance with the invention each conductor 33 comprises a pair of electrical lead wires 38a, 38b which are assembled on the core 10 in such a way that the two wires 38a, 38b are adjacent to one another.

Moreover, the two wires 38a, 38b are positioned overall at the same radial dimension relative to axis A of core 10 at each point of the conductor 33, that is to say at each dimension measured along the conductor 33.

As mentioned above, each turn 32 of conductors 33 is rippled, that is to say it has a sinusoidal shape overall.

Thus, each wire 38a, 38b itself also has a sinusoidal shape overall and comprises, consecutively, a lower transverse strand 40a, 40b which extends below the axial lower end 16 of the core 10, an axial strand 42a, 42b which is received in an associated slot 20, an upper transverse strand 44a, 44b, which extends above the axial upper end 18 of the core 10.

According to another aspect of the invention, the conductor 33 is assembled on the core 10 in such a way that the two lead wires 38a, 38b are superimposed axially and are overlapped axially.

Thus, in each turn 32, the wires 38a, 38b of the same conductor 33 do not cross or overlap radially, which limits the radial thickness of each connecting section 36 of the conductor 33 overall to the value of the diameter of each wire 38a, 38b.

Consequently, each snarl of the coil, which is formed by all the connecting sections 36 of the conductors 33 which are arranged around an axial end of the core 10 of stator 11, is of limited general thickness.

As can be seen in FIG. 3, a first wire 38a is arranged axially above the second wire 38b.

Consequently, the lower strand 40a of the first wire 38a is arranged axially above the lower strand 40b of the second wire 38b, and the upper strand 44a of the first wire 38a is arranged axially above the upper strand 44b of the second wire 38b.

In addition, the axial strands 42a, 42b are distributed in the slots such that two axial strands 42a of the first wire 38a, which are received in two associated consecutive slots 20 and which are connected together by the upper strand 44a of the first wire 38a, are arranged on either side of the axial strands 42b of the second wire 38b, which are received in the same two associated consecutive slots 20 and which are connected together by the upper strand 44b of the second wire 38b.

Also, two axial strands 42a of the first wire 38a which are received in two associated consecutive slots 20 and which are connected together by the lower strand 40a of the first wire 38a, are arranged between the axial strands 42b of the second wire 38b which are received in the same two associated consecutive slots 20 and which are connected together by the lower strand 40b of the second wire 38b.

Figure 4:
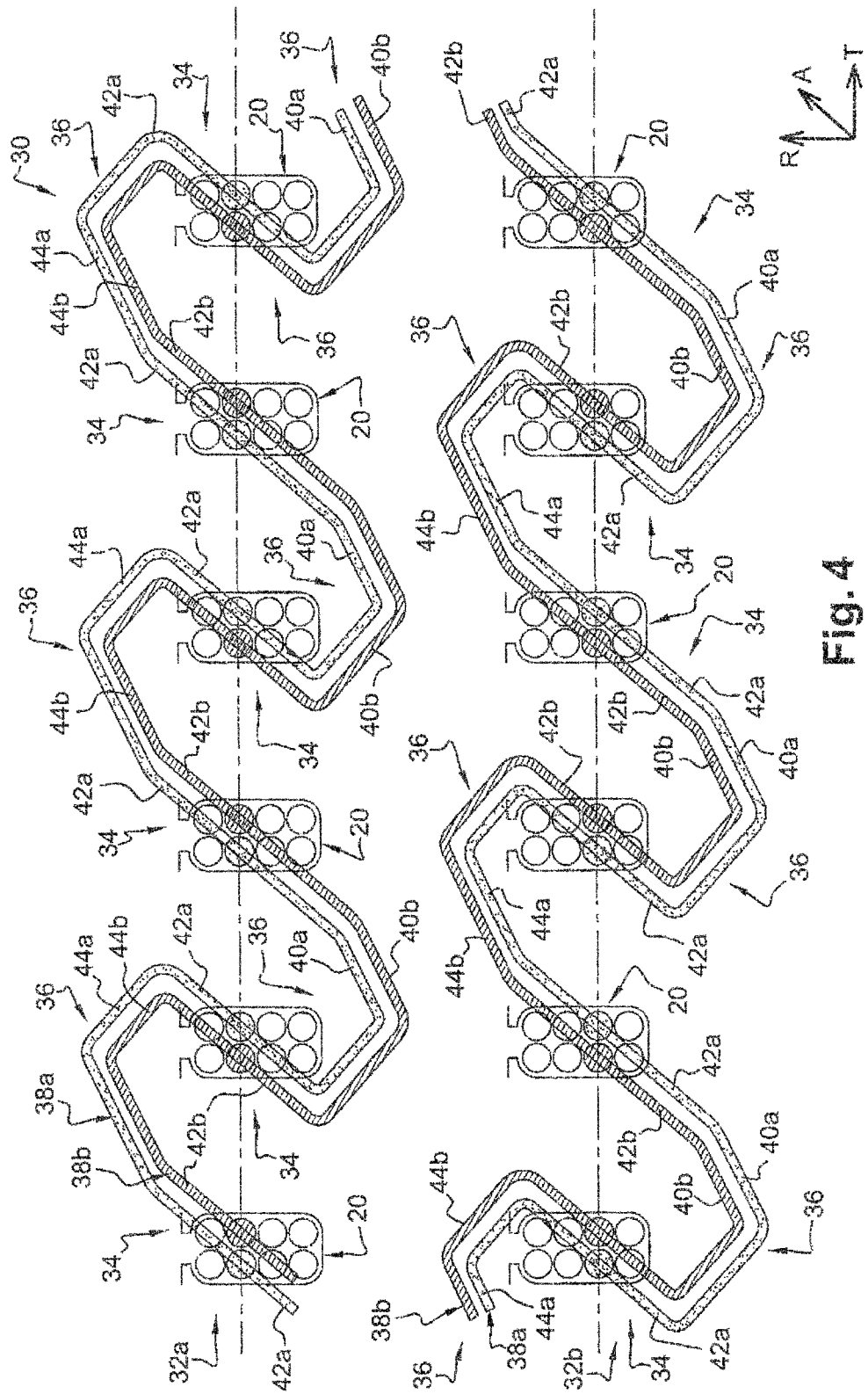
FIG. 4 is a perspective view of two lead wires of the same coil, showing the relative positions of the strands of the two wires, in two adjacent turns of the winding.
Figure 5:
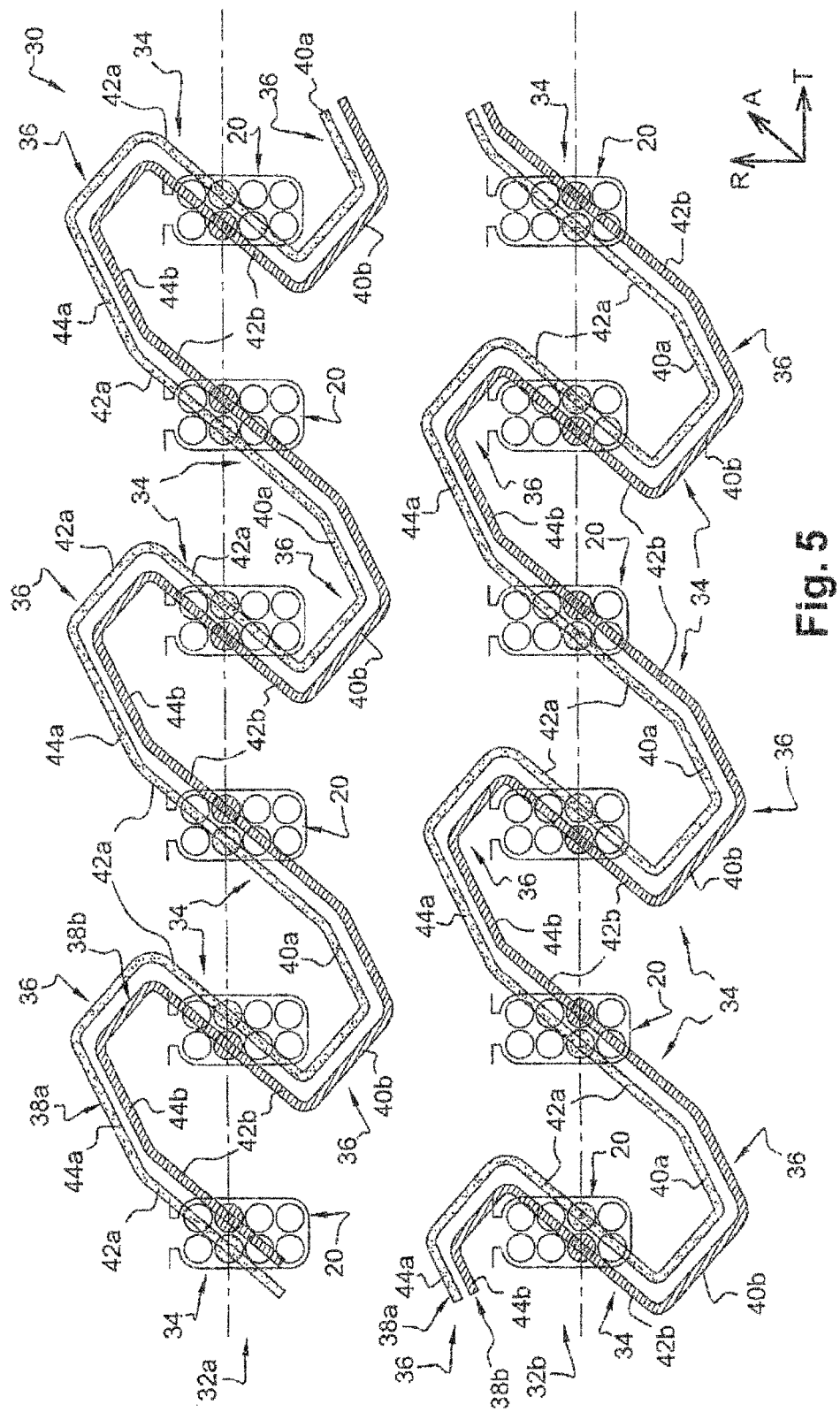
FIG. 5 is a view similar to that of FIG. 4, showing another arrangement of the strands of the two wires in the turns.

According to a preferred embodiment of the coil and as illustrated in FIGS. 4 and 5, each winding 30 is implemented according to the "distributed ripple" type, that is to say for two adjacent slots 20 associated with a phase winding 30, the conductor 33 forming at least one first turn 32a of the phase winding 30 comprises a connecting section 36 which connects the axial sections 34 received in the two adjacent slots 20 mentioned previously, and which is arranged axially above the axial upper end 18 of the core 10, and the conductor 33 forming at least one second turn 32b of the phase winding 30 comprises a connecting section 36 which connects the axial sections 34 received in the two adjacent slots 20 mentioned previously, and which is arranged axially below the axial lower end 16 of the core 10.

According to a first aspect of the invention illustrated in FIG. 4, in the first turn 32a, the first wire 38a is arranged axially above the second wire 38b, as described previously, and in the second turn 32b, the first wire 38a is arranged axially below the second wire 38b.

Consequently, in the first turn 32, two axial strands 42a of the first wire 38a which are received in two associated consecutive slots 20 and which are connected to an upper strand 44a of the first wire 38a, are arranged on either side of the axial strands 42b of the second wire 38b which are received in the same two associated consecutive slots 20 and which are connected to the upper strand 44b of the second wire 38b.

Also, two axial strands 42a of the first wire 38a which are received in two associated consecutive slots 20 and which are connected to the lower strand 40a of the first wire 38a, are arranged between the axial strands 42b of the second wire 38b which are received in the same two associated consecutive slots 20 and which are connected to the lower strand 40b of the second wire 38b.

In the second turn 32b, two axial strands 42b of the second wire 38b which are received in two associated consecutive slots 20 and which are connected to an upper strand 44b of the second wire 38b, are arranged on either side of the axial strands 42a of the first wire 38a which are received in the same two associated consecutive slots 20 and which are connected to the upper strand 44a of the first wire 38a.

Also, two axial strands 42b of the second wire 38b which are received in two associated consecutive slots 20 and which are connected to the lower strand 40b of the second wire 38b, are arranged between the axial strands 42a of the first wire 38a which are received in the same two associated consecutive slots 20 and which are connected to the lower strand 40a of the first wire 38a.

The result is that in each slot, all the axial strands 42a, 42b of the same wires 38a, 38b are aligned radially. That is to say the axial strands 42a of the first wire 38a which are received in a slot 20 are all arranged upstream of the axial strands 42b of the second wire 38b which are received in this same slot or are all arranged downstream of the axial strands 42b of the second wire 38b which are received in this same slot.

According to a second aspect of the invention, and as can be seen in FIG. 5, the first wire 38a is arranged axially above the second wire 38b, in the first turn 32a and in the second turn 32b.

Thus, in each turn, two axial strands 42a of the first wire 38a which are received in two associated consecutive slots 20 and which are connected to an upper strand 44a of the first wire 38a, are arranged on either side of the axial strands 42b of the second wire 38b which are received in the same two associated consecutive slots 20 and which are connected to the upper strand 44b of the second wire 38b.

Also, two axial strands 42a of the first wire 38a which are received in two associated consecutive slots 20 and which are connected to the lower strand 40a of the first wire 38a, are arranged between the axial strands 42b of the second wire 38b which are received in the same two associated consecutive slots 20 and which are connected to the lower strand 40b of the second wire 38b.

The result is that in each slot 20, the axial strands 42a of the first wire 38a are arranged alternately upstream and downstream of the axial strands 42b of the second wire 38b.

Figure 6:
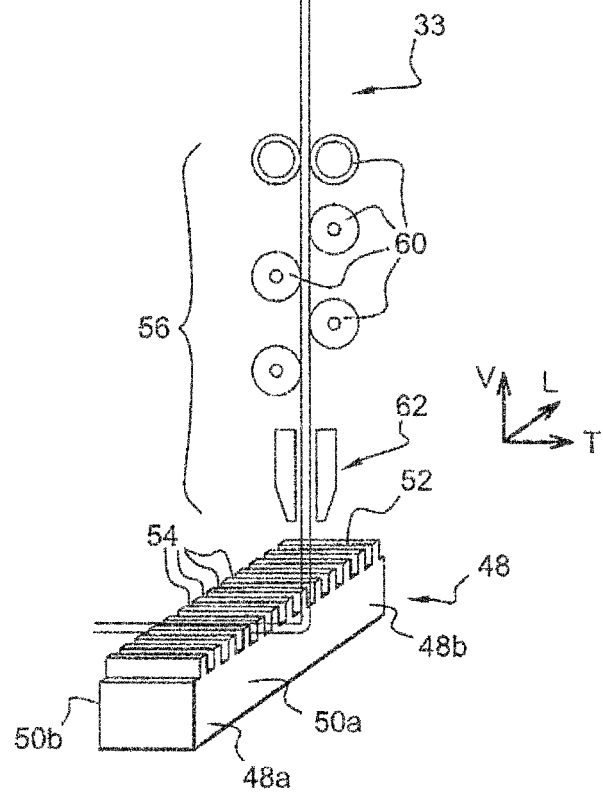
FIG. 6 is a diagrammatic illustration in perspective of apparatus for implementing the first stage of placing the wires onto the linear support.

FIG. 6 and subsequent figures show apparatus for implementing a method for building up the stator 11 according to the invention, as well as the intermediate products obtained at the end of certain stages of the method of embodiment according to the invention.

The method for building up the stator 11 comprises, successively, a stage of assembling the conductors 33 on a linear support in order to form a linear development of turns 32, a first stage of transferring the wires 38a, 38b from the linear support to an annular support in order to form the turns 32, and a second stage of transferring the wires 38a, 38b from the annular support to the core 10 of stator 11.

FIG. 6 shows apparatus for implementing the stage of assembling the conductors 33 on a linear support 48.

In the description of the apparatus which follows, the vertical, longitudinal and transverse orientations according to the reference symbols V, L, T indicated in FIG. 6 will be used on a non-restrictive basis.

The linear support 48 consists of an overall parallelepipedic element with longitudinal principal orientation, and is in particular delimited by two longitudinal vertical lateral faces 50a, 50b and a horizontal upper face 52.

The upper face 52 of the linear support 48 comprises transverse slots 54 which open out transversely into the lateral faces 50a, 50b of the linear support 48 and which are distributed longitudinally according to a constant pitch along the linear support 48.

The apparatus comprises an assembly head 56 associated with each conductor 33 and which enables the wires 38a, 38b of the associated conductor 33 to be assembled on the linear support 48. Here, for the sake of clarity, FIG. 6 shows a single assembly head 56, in association with a single conductor 33, however, the assembly heads 56 being identical, it will be understood that the description of a head 56 which follows applies similarly to the other assembly heads 56.

The assembly head 56 comprises a set of rollers 60 which allows the drawing of wires 38a, 38b coming from the container 58 to be implemented.

The assembly head 56 also comprises a wire guide nozzle 62 through which the wires 38a, 38b of the conductor 33 leave the assembly head 56, and this nozzle 62 which is designed for assembling the wires 38a, 38b of the conductor 33 on the linear support 48, forming the axial sections 34 and the connection sections 36.

In accordance with the invention, and as mentioned above, each conductor 33 consists of two lead wires 38a, 38b.

Consequently, the head 56 for assembling each conductor 33 is fed simultaneously by the two wires 38a, 38b which each come from a container 58, such as a wire reel for example.

The stage of assembling the conductors 33 comprises a first assembly phase during which each assembly head 56 places the wires 38a, 38b of each conductor 33 onto the linear support 48 so as to form a first layer 64 of conductors 33, and a second assembly phase which directly follows the first assembly phase and during which each assembly head 56 places the wires 38a, 38b of each conductor 33 onto the linear support 48 in order to form a second layer 66 of conductors 33 which is superimposed vertically on the first layer 64 of conductors 33.

Figure 7:
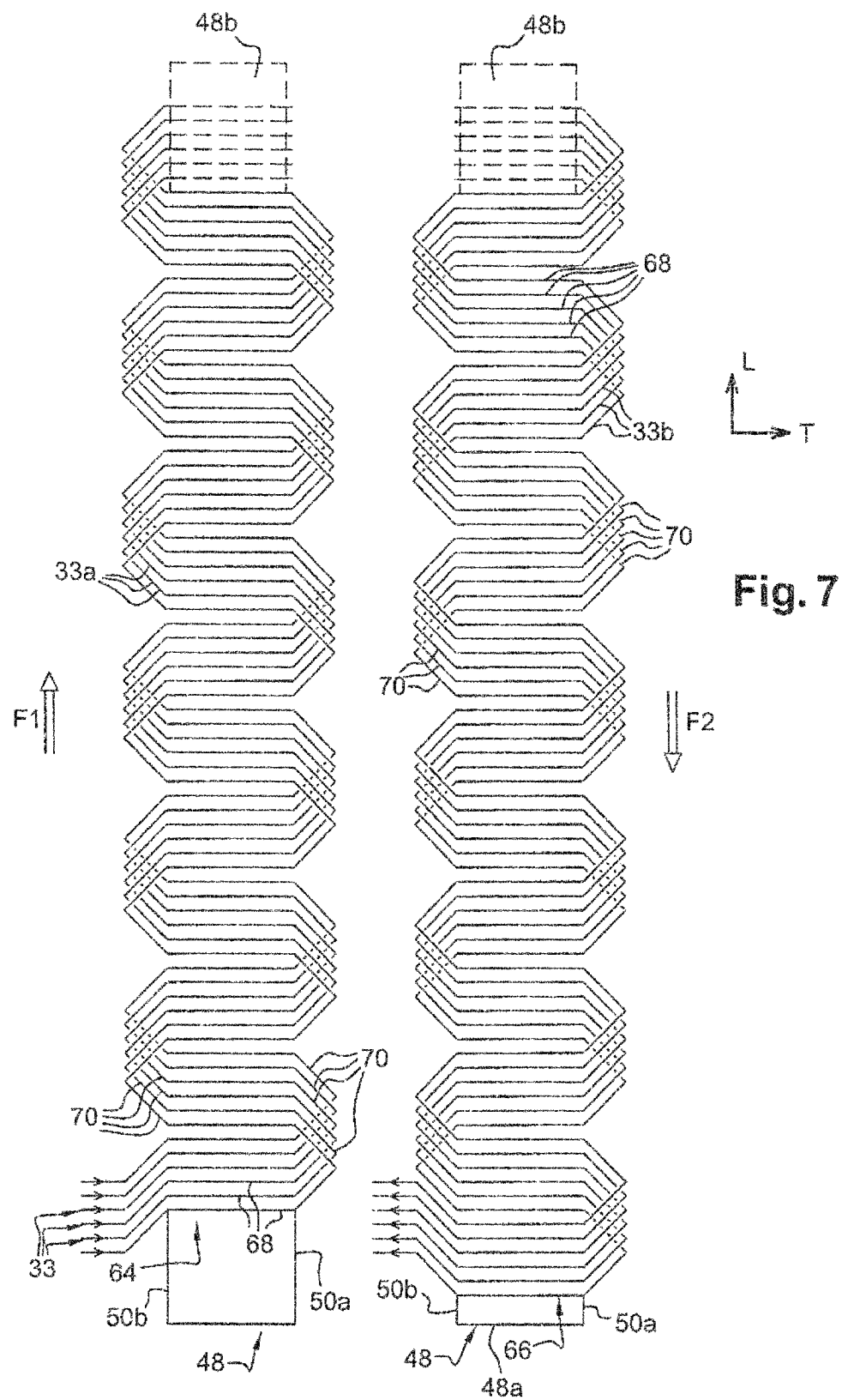
FIG. 7 is a diagrammatic illustration of the two layers of conductors obtained at the end of the first assembly stage, enabling each to acquire the same number of turns.

FIG. 7 shows two layers 64, 66 of conductors 33 which are obtained at the end of the stage of assembling the conductors 33.

For the sake of clarity of the figures, the two layers 64, 66 are illustrated offset transversely relative to one another.

During each assembly phase, the assembly heads 56 are displaced relative to the linear support 48 along an overall sinusoidal trajectory, so as to insert each conductor 33 into slots 54 of the linear support 48 which are associated with the conductor 33.

Thus, during the two assembly phases, the assembly heads 56 successively fill slots 54 of the linear support 48, forming transverse sections 68 which are introduced into the slots 54, and lateral longitudinal sections 70 which are arranged transversely on either side of the linear support 48, opposite each of the lateral faces 50a, 50b.

Also, in each of the two layers 64, 66, each conductor 33 forms ripples, or longitudinal waves, comprising successively a transverse section 68 which is received in an associated slot 54, a longitudinal section 70 which extends transversely opposite the right lateral face 50a of the linear support 48, a consecutive transverse section 68 which is received in an associated consecutive slot 54, and a longitudinal section 70 which extends opposite the left lateral face 50b of the linear support 48.

Each longitudinal section 70 which extends opposite the right lateral face 50a of the linear support 48 connects the free ends on the right side of two consecutive transverse sections 68. In the same way each longitudinal section 70 which extends opposite the left lateral face 50b of the linear support 38 connects the ends on the left of two consecutive transverse sections 68.

In addition, the longitudinal sections 70 are arranged alternately on either side of the linear support 48, that is to say they are offset longitudinally at a pitch equivalent to the distance between two consecutive transverse sections 68.

In a manner similar to those of the core 10 of stator 11, slots 54 of the linear support 48 are associated with a conductor 33 of a phase winding 30 by sets of slots 54.

Thus, two consecutive slots 54 of the same set of slots 54 are separated by slots 54 each of which belongs to one of the other sets of slots 54.

In addition, slots 54 of each set of slots 54 are distributed on the linear support 48 at a constant pitch equal to the number of phase windings 30, that is to say here with a pitch of six slots.

The number of slots 54 of the linear support 48 is determined according to the number of turns 32 of each phase winding 30, and according to the number of slots of core 10, so that each portion of each conductor 33 which forms one of the two conductor layers 64, 66 enables a whole number of turns 32 of the associated phase winding 30 to be formed.

Here, the number of slots 54 of the linear support 48 is determined so that the portion of each conductor 33 forming one of the two conductor layers 64, 66 enables a maximum number of four turns 32 to be formed.

Further, as stated previously, the core 10 comprises seventy-two slots.

Consequently, the linear support 48 comprises two hundred and eighty-eight slots 54.

In accordance with another aspect of the invention, the stage of assembling the conductors 33 consists in simultaneously placing the two wires 38a, 38b of each conductor 33 in associated slots 54 of the linear support 48, during each of the two assembly phases.

During each of the two phases of assembling the conductors 33, the displacement of the assembly heads 56 relative to the linear support 48 is determined so that the two wires 38a, 38b of each conductor 33 are offset transversely relative to one another in each layer 64, 66 of the conductor 33.

Thus, as can be seen in FIGS. 8 and 9, the first wire 38a of the conductor 33 is arranged transversely on the left of the second wire 38b of the same conductor.

According to another aspect of the linear support 48, and as can be seen in detail in FIG. 9, the width of each slot 54, measured in the longitudinal direction, is equal overall to the thickness of each of the two wires 38a and 38b.

Consequently, in each slot 54 of the linear support 48, the strands 72a, 72b of each wire 38a, 38b which are received in this slot, are superimposed vertically one above the other.

According to yet another aspect of the invention, the strands 72a, 72b of the wires 38a, 38b are arranged alternately one above the other in associated slots 54 of the linear support 48, that is to say in a first associated slot 54, the strand 72a of the first wire 38a, which is received in this slot 54, is arranged vertically above the strand 72b of the second wire 38b which is received in this same slot 54.

Further, in a second associated slot 54, which follows the first associated slot 54, the strand 72a of the first wire 38a, which is received in this second associated slot 54, and arranged vertically below the strand 72b of the second wire 38b which is received in this second associated slot 54.

Thus, if each layer 64, 66 of the conductor 33 is viewed from the side, the longitudinal strands 74a, 74b which connect the transverse strands 72a, 72b which are received in two adjacent slots 54, cross over one another.

However, as mentioned above, the two wires 38a, 38b are offset transversely relative to one another in each layer 64, 66.

Consequently, the two longitudinal strands 74a, 74b are not superimposed vertically.

Owing to the fact that the two wires 38a, 38b of each conductor 33 are offset transversely relative to one another, the lengths of the longitudinal strands 74a, 74b of the wires 38a, 38b connecting the transverse strands 72a, 72b which are received in two associated consecutive slots 54, are different.

Here for example, as can be seen in FIG. 8, the first wire 38a is arranged transversely on the left of the second wire 38b.

The result is that the length of the longitudinal strand 74a of the first wire 38a, which is arranged opposite the right lateral face 50a of the linear support 48 and which connects two transverse strands 72a received in two associated consecutive slots 54, is less than the length of the longitudinal strand 74b of the second wire which is itself also arranged opposite the right lateral face 50a of the linear support 38 and which connects the two transverse strands 72b of the second wire 38b received in these same two associated consecutive slots 54.

On the other hand, the length of the longitudinal strand 74a, which is arranged opposite the left lateral face 50b of the linear support 48 and which connects two transverse strands 72a of the first wire 38a received in two associated consecutive slots, is greater than the longitudinal strand 74b of the second wire 38b, which connects the transverse strands 72b of the second wire 38b received in these same two slots.

According to a first aspect of the invention which is illustrated in FIG. 4, and as described previously, the first wire 38a is arranged axially above the second wire 38b in a first turn 32a, and in a second turn 32b, the first wire 38a is arranged axially below the second wire 38b.

In order to obtain such an arrangement of the two wires 38a, 38b relative to one another, the first assembly phase consists in placing the two wires 38a, 38b on the linear support 48 so that in the first layer 64 of conductors 33, the first wire 38a is arranged transversely on the right of the second wire 38b. On the other hand, the second assembly phase consists in arranging the two wires 38a and 38b on the linear support 48 so that in the second layer 66 of conductors 33, the first wire 38a is arranged transversely on the left of the second wire 38b.

Moreover, so that each phase winding 30 is of the distributed ripple type, and as can be seen in FIG. 7, the assembly stage consists in assembling each conductor 33 on the linear support 48 so that in the first layer 64, the conductor 33 is arranged during the first assembly phase to form a first sinusoid, and so that in the second layer, the conductor 33 forms a second sinusoid which is in phase opposition relative to the first sinusoid.

Thus, around two consecutive slots 54 of the linear support 48, which are associated with the conductor 33, the transverse sections 68 of the conductor 33 which are received in these two slots 54 and which form the first layer 64, are connected together by a longitudinal section 70 which is arranged opposite a first lateral face 50a, 50b of the linear support 48, for example opposite the right lateral face 50a, on the other hand, the transverse sections 68 of the conductor 33 which are received in these two slots and which form the second layer 66 of conductors 33 are connected by a longitudinal section 70 which is arranged opposite the other lateral face 50a, 50b of the linear support 48, that is to say in this example opposite the left lateral face 50b.

According to this first aspect of the invention, the lead wires 38a, 38b are arranged in the slots 54 of the linear support so that they cross over one another around the downstream longitudinal end 48b of the linear support 48.

According to a second aspect of the invention, as illustrated in FIG. 5, in each turn 32 of a winding 30, the first wire 38a is arranged axially above the second wire 38b.

Consequently, according to this aspect of the invention, the two phases of assembling the conductors 33 consist in placing the two wires 38*a*, 38*b* onto the linear support 48 so that in each layer 64, 66 of the conductor 33, the first wire 38*a* is arranged transversely on the right of the second wire 38*b*.

In accordance with another aspect of the method according to the invention, the assembly stage, for each phase winding 30, consists in placing the same conductor 33 onto the linear support 48 during the first assembly phase and during the second assembly phase.

Consequently, each phase winding 30 is built up on the basis of a single conductor 33, and thus on the basis of only two wires 38*a* and 38*b*. Also a first section 33*a* of each conductor 33 partly forms the first layer 64 of the conductor 33, and a second section 33*b* of each conductor 33 partly forms the second layer 66 of the conductor 33.

Further, the second assembly phase is implemented continuously after the first assembly phase in order to have only a reduced time gap between the two assembly phases.

FIG. 7 shows, with arrow F1, that the first assembly phase consists in gradually introducing the transverse sections 68 of the first section 33*a* of each conductor 33 from a slot 54 of the associated linear support 48 which is positioned around an upstream longitudinal end 48*a* of the linear support 48, as far as an associated slot 54 positioned around the downstream longitudinal end 48*b* of the linear support 48, that is to say from upstream to downstream.

The second assembly phase, which is continually implemented after the first assembly phase consists in progressively introducing the transverse sections 68 of the second section 33*b* of each conductor 33 from the downstream to the upstream, that is to say from an associated slot 54 positioned around the downstream end 48*b* of the linear support 48, as far as an associated slot 54 positioned around the upstream end 48*a* of the linear support 48, as illustrated by the arrow F2.

Subsequent to the stage of assembling the conductors 33 on the linear support 48, the method for building up the stator 11 according to the invention comprises a first stage of transferring the conductors 33 from the linear support 48 to an annular support 78 which consists overall in winding the two layers 64, 66 of conductors 33 on the annular support 78 in order to form the turns 32 of the phase windings 30.

FIGS. 10 to 13 show apparatus for implementing the first transfer stage, which comprises the annular support 78, a casing 80 for guiding the annular support 78 with displacement relative to the linear support 48, two lateral guides 82 and a lower base 84.

Figure 12:
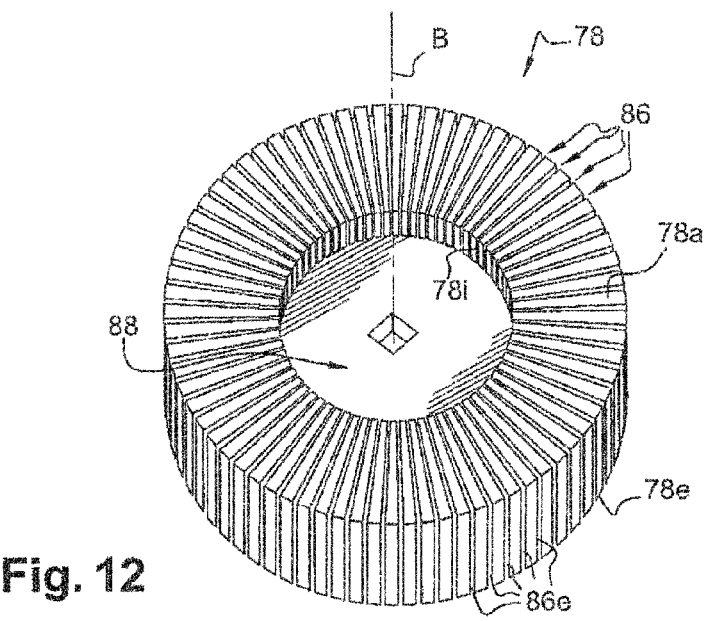
FIG. 12 is a diagrammatic illustration of the annular support shown in FIGS. 10 and 11.

As can be seen in detail in FIG. 12, the annular support 78 is a rotating element with transverse principal axis B, which is delimited radially by an external cylindrical face 78*e* and an internal cylindrical face 78*i*, which is delimited axially by two radial faces of axial end 78*a* and which comprises axial slots 86 provided in the external cylindrical face 78*e* of the annular support 78 and opening out axially into the radial faces of axial end 78*a* of the annular support 78.

The distance between the external radial ends 86*e* of two adjacent slots 86 of the annular support 78 is equal to the distance between two adjacent slots 54 of the linear support 48.

The number of slots 86 of the annular support 78 is equal to the number of slots 20 of the core 10 of stator 11, that is to say that here the annular support 78 comprises seventy-two slots 86.

The annular support 78 finally comprises a central hub 88 which is fixed on the internal cylindrical face 78*i* of the annular support 78 and which allows the annular support 78 to be rotated about its principal axis B during the first transfer stage.

The axial length of the central hub 88, measured relative to the principal axis B of the annular support 78, is less than the distance between the two radial faces of axial end 78*a* of the annular support 78.

Moreover, the central hub 88 is arranged axially along the axis B of the annular support 78 overall in the centre of the annular support 78, retracted relative to each of the two radial faces of the axial end 78*a* of the annular support 78.

Consequently, each slot 86 of the annular support 78 opens out radially into the internal cylindrical face 78*i* of the annular support 78, on either side of the central hub 88.

Casing 80 comprises a boring 90 coaxial to the annular support 78 and in which the annular support 78 is received, free to rotate about its principal axis B.

Casing 80 comprises a lower horizontal face 80*i* which is able to come to rest against the horizontal upper face 52 of the linear support 48.

Boring 90 of casing 80 opens out vertically downwards into the lower face 80*i* of casing 80 to allow the conductors 33 to be transferred to the annular support 78.

During implementation of the first transfer stage, the linear support 48 is received transversely between the lateral guides 82 and is received vertically between the lower face 80*i* of the casing 80 and a horizontal upper face 84*s* of the lower base 84.

Thus, the linear support 48 is guided longitudinally without play during the first transfer stage.

Each lateral guide 82 moreover comprises an upper face 92 in the form of a slope, the incline of which is determined such that each upper face 92 is able to rest below the longitudinal strands 74*a*, 74*b* of the wires 38*a*, 38*b*, so as to progressively draw the wires 38*a*, 38*b* to the top, for their transfer to the annular support 78.

Figure 11:
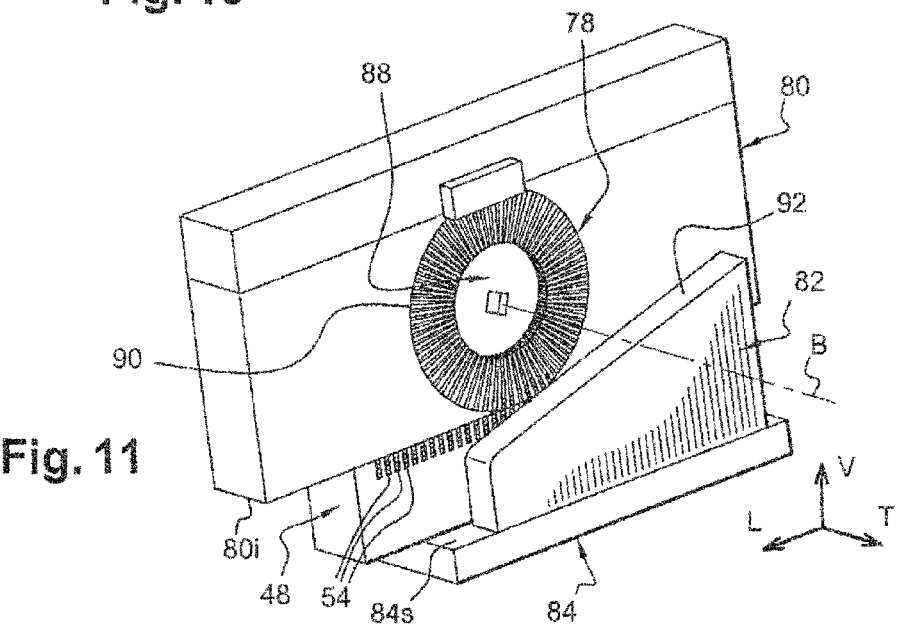
FIG. 11 is a larger scale perspective view of the apparatus shown in FIG. 10.
Figure 13:
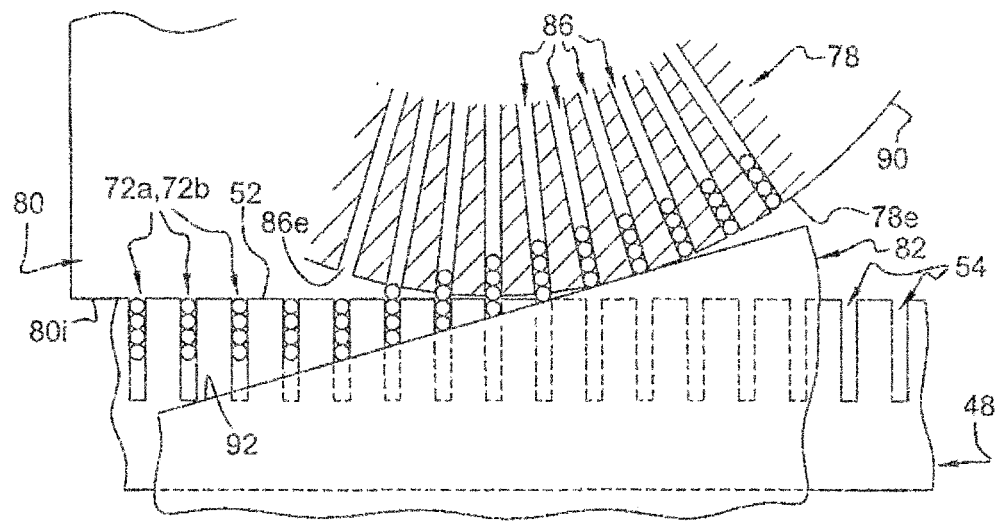
FIG. 13 is a larger scale detail of the apparatus illustrated in FIG. 10, showing the transfer of the lead wires by means of the lateral guides.

According to the embodiment illustrated in FIGS. 11 and 13, the upper face 92 of each lateral guide 82 is flat and is inclined relative to a horizontal plane.

However, it will be understood that the invention is not limited to this embodiment, and that the form of the upper face 92 of each guide may be different, for example, the upper face 92 can be curved convexly upwards, open concavely upwards, or it can form two inclined planes at different angles.

Lastly, each lateral guide 82 can also be produced in several parts, and/or it can be mobile vertically so as to push the longitudinal strands 74*a*, 74*b* of the wires 38*a*, 38*b* upwards.

The apparatus for implementing the first transfer stage finally comprises means of indexing (not illustrated) of the annular support 78 relative to the linear support 48 so that during the first transfer stage, each slot 86 of the annular support 78 comes to lie opposite a slot 54 of the linear support 48.

The first transfer stage consists in making the annular support 78 roll on the upper face 52 of the linear support 48 so that slots 86 of the annular support 78 come to lie successively opposite slots 54 of the linear support 48 and without the annular support 78 slipping relative to the linear support 48.

For this purpose during implementation of the first transfer stage, the external cylindrical face 78*e* of the annular support 78 is positioned vertically above the upper face 52 of the linear support 48. The external cylindrical face 78*e* of the annular support 78 can possibly be placed in contact with the upper face 52 of the linear support 48.

During rolling of the annular support 78, and as can be seen in FIG. 13, on the linear support 48, casing 80, the lateral guides 82 and the lower base 84 are repositioned longitudinally relative to the linear support 48, following the longitudinal displacement of the annular support 78 relative to the linear support 48.

During the first transfer phase, the upper face 92 of each lateral guide 82 rests upwardly against the longitudinal strands 74a, 74b of the wires 38a, 38b which are positioned around the lower end of each slot 54 of the linear support 48.

Thus, the upper faces 92 of the lateral guides 82 allow simultaneous transfer of the transverse sections 68 and the longitudinal sections 70 of the conductors forming the first layer 64 and the second layer 66 of conductors 33.

As mentioned above, the annular support 78 comprises a number of slots 86 which is equal to the number of slots 20 of the core 10 of stator 11 and the linear support 48 comprises a number of slots 54 which is greater than the number of slots 20 of the core 10.

Consequently, during the first transfer stage, the annular support 78 makes several turns about its principal axis B while rolling on the upper face 52 of the linear support 48, and the two layers 64, 66 of conductors 33 are wound around the annular support 78, forming two coaxial spirals, of which each turn of one of the two spirals corresponding to the annular support 78 wrapping about its principal axis B once.

During the first transfer stage, the transverse strands 72a, 72b of the two wires 38a, 38b which are received in each slot 54 of the linear support 48, are all transferred into the same associated slot 86 opposite the annular support 78.

Further, since the annular support 78 makes several turns about its axis B during the first transfer stage, each slot 86 successively receives the transverse strands 72a, 72b which were received in several slots 54 of the linear support 48 associated with the same conductor 33.

Figure 14:
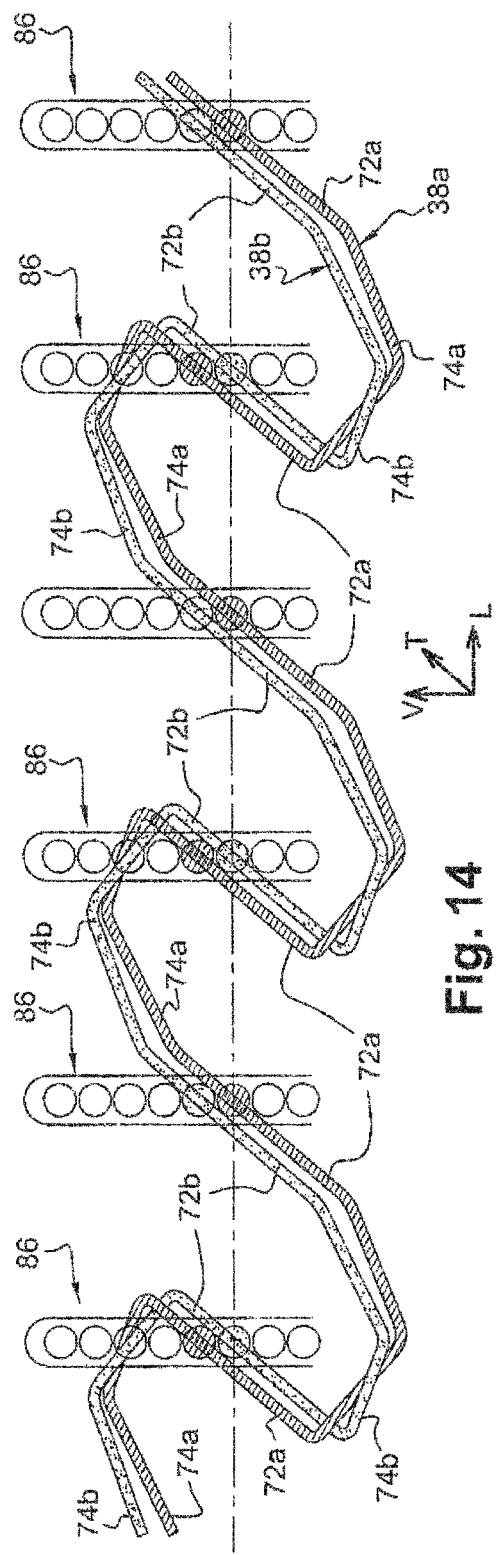
FIG. 14 is a diagrammatic illustration in perspective of two lead wires which have been transferred onto the annular support at the end of the first transfer stage, showing the position of the sections of the two wires, relative to one another.

Thus, as can be seen for example in FIG. 14, when the annular support 78 makes two turns about its axis B during the first transfer stage, each slot 86 receives eight transverse strands 72a, 72b.

Moreover, the width of each slot 86 of the annular support 78 here is also equal overall to the width of each of the two wires 38a, 38b.

Consequently, the transverse strands 72a, 72b of the wires 38a, 38b are radially superimposed in slots 86 of the annular support 78 and according to the same configuration as in slots 54 of the linear support 48.

Thus, the transverse strands 72a, 72b are radially superimposed in each slot 86 of the annular support 78 in alternate manner, and the longitudinal strands 74a, 74b of the two wires 38a, 38b, which connect the transverse strands 72a, 72b, are received in two associated consecutive slots 86 pertaining to the same turn 32.

Figure 10:
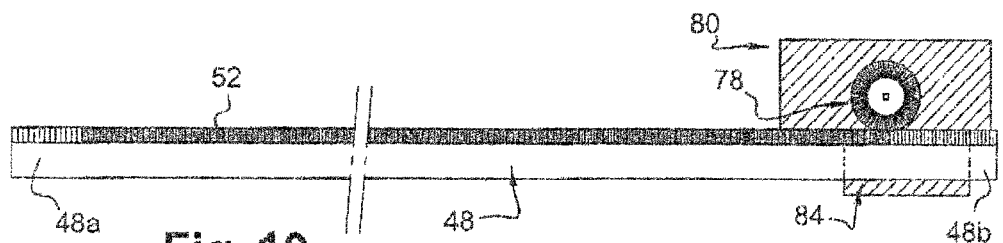
FIG. 10 is a diagrammatic illustration of apparatus for implementing the first transfer stage.

In accordance with another aspect of the invention, and as can be seen in FIG. 10, the first transfer stage consists in making the annular support 78 roll on the upper face 52 of the linear support 48 from downstream to upstream, so as to progressively transfer the transverse sections 68 of the conductors 33 to the annular support 78 from the transverse sections 68 which are received in the slot 54 of the linear support 48, which slot is positioned at the downstream longitudinal end 48b of the linear support 48, as far as the transverse sections 68 which are received in the slot 54 of the linear support 48, which slot is positioned at the upstream longitudinal end 48a of the linear support 48.

Figure 15:
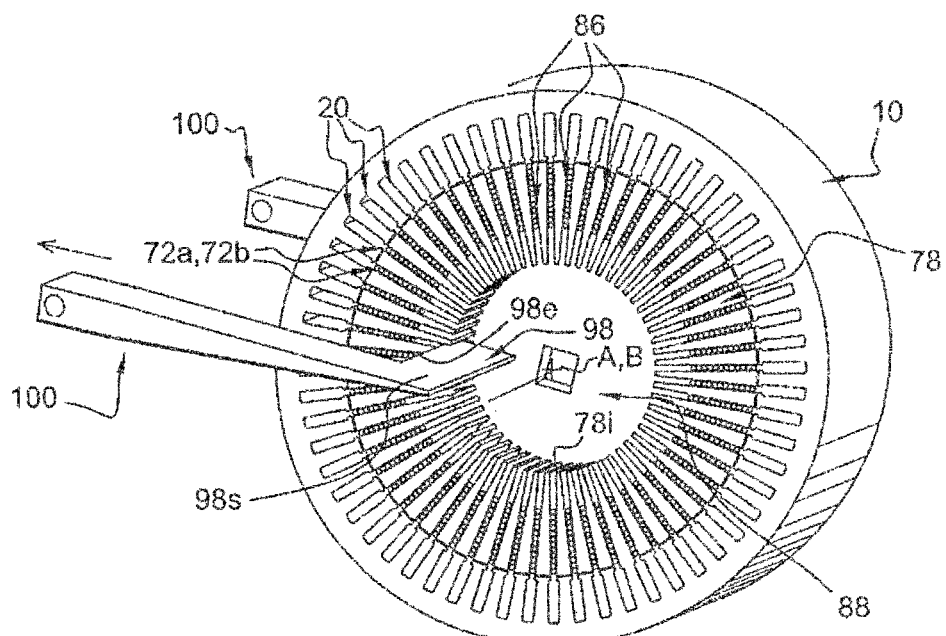
FIG. 15 is a diagrammatic illustration in perspective of the apparatus for implementing the second transfer stage, in which the extraction prongs are shown in the initial position.
Figure 16:
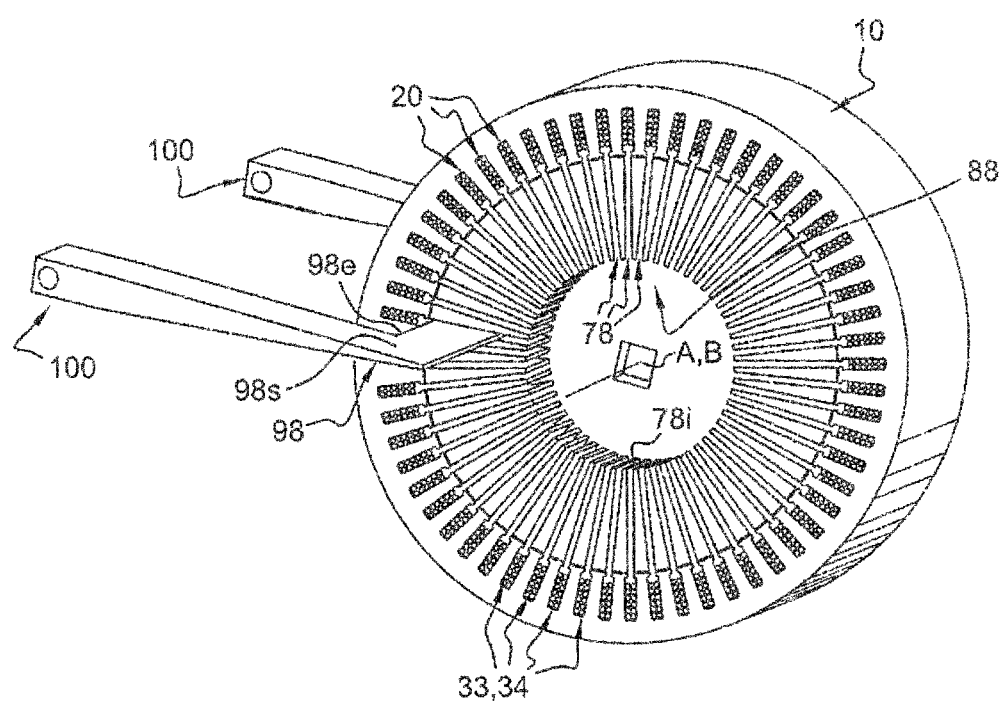
FIG. 16 is a view similar to that in FIG. 15, in which the extraction prongs are shown in the final position for which the coil has been transferred onto the core.

FIGS. 15 and 16 show apparatus for implementing the second stage of transferring the conductors 33 from the annular support 78 to the core 10 of stator 11.

This apparatus comprises means of positioning the annular support 78 in the core 10, so that the annular support 78 is received coaxially to the core 10, in the circular housing delimited by the internal cylindrical face 12 of the core. Lastly, the diameter of the exterior cylindrical face 78e of the annular support 78 is equal overall to the diameter of the internal cylindrical face 12 of the core 10.

The apparatus also comprises means of indexing the annular support 78 about its principal axis B, so that each slot 86 of the annular support 78 is opposite a slot 20 of the core 10 and opens out radially into the axial groove 26 of the associated slot 20.

The apparatus finally comprises radial insertion prongs 98 each of which extends in a radial plane relative to the principal axis B of the annular support 78 and of the core 10.

The apparatus comprises a pair of insertion prongs 98 which is associated with each slot 86 of the annular support 78, and the insertion prongs 98 of the same pair are distributed axially on either side of the central hub 88 of the annular support 78.

Here, the annular support 78 comprises seventy-two slots 76, the apparatus therefore comprises seventy-two pairs of insertion prongs 98 being a total of one hundred and forty-four insertion prongs 98.

For the sake of clarity FIGS. 15 and 16 show a single pair of insertion prongs 98.

Pairs of prongs 98 being identical and distributed angularly about the principal axis B of the annular support 78, the description of the prongs 98 which follows applies in an identical manner to the other insertion prongs 98.

The two insertion prongs 98 of the same pair are associated with a single slot 86 of the annular support 78.

They extend in the median radial plane of the associated slot 86, and the thickness of each prong 98 is less than the smallest width of the associated slot 86.

As mentioned above, two prongs 98 from the same pair are arranged axially on either side of the central hub 88 of the annular support 78.

More precisely, as can be seen in FIG. 15, at the start of the second transfer stage, each prong 98 is positioned radially so that the edge of the external radial end 98e of each prong 98 is positioned radially around the internal cylindrical face 78i of the annular support 78.

The external axial end 98s of each prong 98, that is to say the one which is positioned axially at a distance from the central hub 88, projects axially relative to the radial face of the axial end 78a associated with the annular support 78, and bears a rod 100 for pulling the prong 98, which extends radially outwards relative to the principal axis B of the annular support 78.

During implementation of the second transfer stage, the insertion prongs 98 of the same pair are pulled radially relative to the principal axis B of the annular support 78, so that each prong 98 is displaced radially in the associated slot 86 of the annular support towards the exterior of the annular support 78, simultaneously drawing the transverse strands 72a, 72b which are received in this slot 86, so that these transverse strands 72a, 72b migrate into the associated slot 20 of the core 10, then forming the strands 42a, 42b of the phase windings 30.

At the end of the pulling phase, and as can be seen in detail in FIG. 16, each prong 98 is positioned radially relative to the principal axis B of the annular support 78 so that its external radial end edge 98e is positioned overall around the external cylindrical face 78e of the annular support 78.

Moreover, all the transverse strands 72a, 72b which were received in each slot 86 of the annular support 78 have migrated into an associated slot of the core 10.

According to a preferred embodiment of this second transfer stage, all the insertion prongs 98, being displaced radially, are simultaneously pulled outwards in the associated slots 86 of the annular support 78.

Thus, all the transverse strands 72*a*, 72*b* are transferred simultaneously.

As stated above, the width of each slot 20 of the core 10 is equal overall to double the width of each wire 38*a*, 38*b*, and for each turn 32 of a phase winding 30, the two wires 38*a*, 38*b* are arranged overall at the same radial dimension relative to one another.

During their transfer from a slot 86 of the annular support 78, in which they are radially aligned, to the associated slot 20 of the core 10 of stator 11, in which they are arranged at the same radial dimension, strands 72*a*, 72*b* are distributed tangentially relative to the principal axis A of the core 10 due to the inherent resilience of the wires 38*a*, 38*b*.

Indeed as mentioned above, the longitudinal strands 74*a*, 74*b* of the wires 38*a*, 38*b* have a different length, thus the two transverse strands 72*a*, 72*b* of a wire 38*a*, 38*b* which are received in two slots 86 of the annular support 78 and which are connected together by a longitudinal strand 74*a*, 74*b* having the shorter length, naturally have a tendency to come towards one another in the associated slots 20 of the core 10, relative to the two transverse strands 72*a*, 72*b* which are received in the same two slots 86 of the annular support 78 and which are connected by a longitudinal strand having the greater length, which then naturally have a tendency to move apart from one another.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A stator for an electrical machine having an axis (A), comprising:
   a) a plurality of axially extending slots;
   b) within every slot of a subset of the slots, at least four sections of conductor, arranged so that
      i) a first section of conductor and a second section of conductor are both located at a first radial distance from the axis (A);
      ii) a third section of conductor and a fourth section of conductor are both located at a second radial distance from the axis (A);
   c) a plurality of connecting sections which
      i) connect all first sections of conductor in electrical series with each other to form a first continuous winding;
      ii) connect all second sections of conductor in electrical series with each other to form a second continuous winding;
      iii) connect all third sections of conductor in electrical series with each other to form a third continuous winding which is electrical series with the first sections of conductor; and
      iv) connect all fourth sections of conductor in electrical series with each other to form a fourth continuous winding which is in electrical series with the second sections of conductor;
   in which a pair of electrical conductors begin at a first slot and terminates at an Nth slot, and which forms a first layer in said slots, and in which:
   d) said pair of electrical conductors reverses direction at the Nth slot, and runs through the same slots in reverse sequence to form a second layer, such that all members of said pair of electrical conductors, within the slots in the second layer are located at the same radial distance D2 from the axis.

2. The stator according to claim 1, wherein for each turn, two wires form complementary axial ripples which are overlapped axially, so that one of the two wires is positioned axially above the other.

3. The stator according to claim 1, wherein each wire of the conductor comprises consecutively, from upstream to downstream
   a lower strand which is arranged overall below the lower face of an annular core;
   an upstream axial strand which is arranged in a first slot associated with the winding;
   an upper strand which is arranged overall above the upper face of the annular core, and
   a downstream axial strand which is arranged in a second slot associated with the winding, said second slot being positioned downstream relative to said first slot.

4. The stator according to claim 1, wherein in at least one turn of the coil, the lower strand of a first wire is arranged axially above a lower strand of a second wire, the first axial strand of the first wire is positioned upstream of the first axial strand of the second wire, the upper strand of the first wire is arranged axially above the upper strand of the second wire and the second axial strand of the first wire is positioned downstream of the second axial strand of the second wire.

5. The stator according to claim 1, wherein in at least one other turn of the coil, the lower strand of the first wire is arranged axially below a lower strand of the second wire, the first axial strand of the first wire is positioned upstream of the first axial strand of the second wire, the upper strand of the first wire is arranged axially below the upper strand of the second wire and the second axial strand of the first wire is positioned downstream of the second axial strand of the second wire.

6. The stator according to claim 3, wherein all the axial strands of each wire, which are arranged in the same slot, are positioned at the same angular dimension about axis A of the stator.

7. The stator according to claim 2, wherein each wire of the conductor comprises consecutively, from upstream to downstream
   a lower strand which is arranged overall below the lower face of the annular core;
   an upstream axial strand which is arranged in a first slot associated with the winding;
   an upper strand which is arranged overall above the upper face of the annular core, and
   a downstream axial strand which is arranged in a second slot associated with the winding, said second slot being positioned downstream relative to said first slot.

8. The stator according to claim 2, wherein in at least one turn of the coil, the lower strand of a first wire is arranged axially above a lower strand of a second wire, the first axial strand of the first wire is positioned upstream of the first axial strand of the second wire, the upper strand of the first wire is arranged axially above the upper strand of the second wire and the second axial strand of the first wire is positioned downstream of the second axial strand of the second wire.

9. The stator according to claim 3, wherein in at least one turn of the coil, the lower strand of a first wire is arranged axially above a lower strand of a second wire, the first axial strand of the first wire is positioned upstream of the first axial strand of the second wire, the upper strand of the first wire is arranged axially above the upper strand of the second wire and the second axial strand of the first wire is positioned downstream of the second axial strand of the second wire.

10. The stator according to claim 2, wherein in at least one other turn of the coil, the lower strand of the first wire is arranged axially below a lower strand of the second wire, the first axial strand of the first wire is positioned upstream of the first axial strand of the second wire, the upper strand of the first wire is arranged axially below the upper strand of the second wire and the second axial strand of the first wire is positioned downstream of the second axial strand of the second wire.

11. The stator according to claim 3, wherein in at least one other turn of the coil, the lower strand of the first wire is arranged axially below a lower strand of the second wire, the first axial strand of the first wire is positioned upstream of the first axial strand of the second wire, the upper strand of the first wire is arranged axially below the upper strand of the second wire and the second axial strand of the first wire is positioned downstream of the second axial strand of the second wire.

12. The stator according to claim 4, wherein in at least one other turn of the coil, the lower strand of the first wire is arranged axially below a lower strand of the second wire, the first axial strand of the first wire is positioned upstream of the first axial strand of the second wire, the upper strand of the first wire is arranged axially below the upper strand of the second wire and the second axial strand of the first wire is positioned downstream of the second axial strand of the second wire.

13. The stator according to claim 4, wherein all the axial strands of each wire, which are arranged in the same slot, are positioned at the same angular dimension about axis A of the stator.

14. The stator according to claim 1, wherein said adjacent slots in the sequence are separated by other slots, through which the pair of electrical conductors do run.

15. The stator according to claim 1, in which the conductors in the first layer are connected in electrical series with the respective conductors in the second layer.

16. A stator for an electrical machine having an axis (A), comprising:
   a) a plurality of axially extending slots;
   b) within every slot of a subset of the slots, at least four sections of conductor, arranged so that
      i) a first section of conductor and a second section of conductor are both located at a first radial distance from the axis (A);
      ii) a third section of conductor and a fourth section of conductor are both located at a second radial distance from the axis (A);
   c) a plurality of connecting sections which
      i) connect all first sections of conductor in electrical series with each other to form a first continuous winding;
      ii) connect all second sections of conductor in electrical series with each other to form a second continuous winding;
      iii) connect all third sections of conductor in electrical series with each other to form a third continuous winding which is electrical series with the first sections of conductor; and
      iv) connect all fourth sections of conductor in electrical series with each other to form a fourth continuous winding which is in electrical series with the second sections of conductor;
   in which
   d) a pair of electrical conductors reverses direction at a first slot, and runs through the same slots in the same sequence as a first layer to form a third layer, such that all members of said pair of electrical conductors, in the slots, in the third layer are located at the same radial distance D3 from the axis.

17. A stator for an electrical machine having an axis (A), comprising:
   a) a plurality of axially extending slots:
   b) within every slot of a subset of the slots, at least four sections of conductor, arranged so that
      i) a first section of conductor and a second section of conductor are both located at a first radial distance from the axis (A);
      ii) a third section of conductor and a fourth section of conductor are both located at a second radial distance from the axis (A);
   c) a plurality of connecting sections which
      i) connect all first sections of conductor in electrical series with each other to form a first continuous winding;
      ii) connect all second sections of conductor in electrical series with each other to form a second continuous winding;
      iii) connect all third sections of conductor in electrical series with each other to form a third continuous winding which is electrical series with the first sections of conductor; and
      iv) connect all fourth sections of conductor in electrical series with each other to form a fourth continuous winding which is in electrical series with the second sections of conductor;
   in which
   d) a pair of electrical conductors reverses direction at an Nth slot, and runs through the same slots in the same sequence as a second layer to form a fourth layer, such that all members of said pair of electrical conductors, in the slots, in the fourth layer are located at the same radial distance D4 from the axis.

* * * * *